Jan. 31, 1950     F. ROSENTHAL     2,496,067
BIPHENYL DERIVATIVES AND METHOD OF PREPARING THEM
Filed Nov. 30, 1945
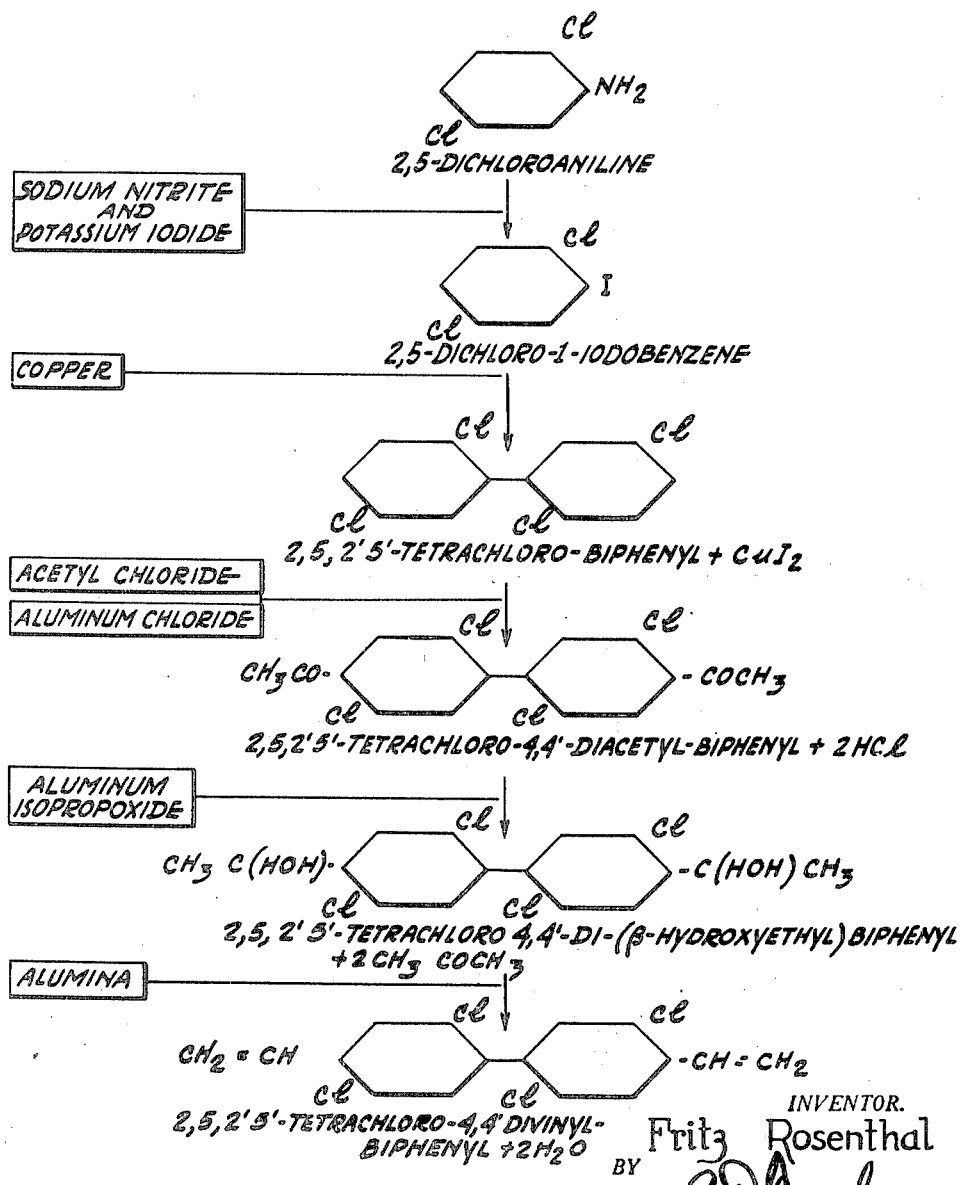
INVENTOR.
Fritz Rosenthal
BY
ATTORNEY Patented Jan. 31, 1950

2,496,067

UNITED STATES PATENT OFFICE 2,496,067

BIPHENYL DERIVATIVES AND METHOD OF PREPARING THEM

Fritz Rosenthal, Crescent Park, Borough of Bellmawr, N. J., assignor to Radio Corporation of America, a corporation of Delaware Application November 30, 1945, Serial No. 632,083

16 Claims. (Cl. 260—618)

This invention relates to the preparation of 2,5,2'5'-tetrahalogeno-4,4'-divinyl - biphenyl. It also relates to the preparation of certain other biphenyl derivatives which are intermediates in the preparation of the above mentioned end product.

It is an object of the invention to prepare the compound 2,5,2'5' - tetrahalogeno - 4,4' - divinyl-biphenyl.

Another object is to prepare 2,5,2'5'-tetrahalogeno-4,4'-diacetyl-biphenyl.

Still another object is to prepare 2,5,2'5' - tetrahalogeno 4,4'-di-($\beta$-hydroxyethyl)-biphenyl.

The accompanying drawing illustrates the steps of the process.

The preparations will be illustrated using as starting products the chlorine derivatives which are cheaper and easier to obtain on the market.

The starting material used for the preparation may be 2,5-dichloro-aniline. By means of the Sandmeyer reaction, well known in the art, sodium nitrite and potassium iodide are reacted with 2,5-dichloro-aniline to produce 2,5-dichloro-1-iodobenzene.

Two molecules of the 2,5-dichloro-1-iodobenzene are then reacted with copper at elevated temperature to form 2,5,2'5'-tetrachloro-biphenyl. While the compound is not unknown it has heretofore been prepared by heating at red heat 2,5-dichlorobenzene in contact with a wire preferably of steel and as so prepared was obtained impure and in low yield.

Example 1

To 8 parts by weight of 2,5-dichloro-1-idobenzene held at a temperature of 230° C. are added 5 g. of precipitated copper powder. Heating at 230–240° C. is continued with stirring for about 30 minutes. The reaction chamber is then cooled and the contents filtered. The filtrate is extracted with toluene and is violet in color at this stage. After standing several hours a mass of needle-like crystals forms. This mass is filtered and dried. The crystals dissolve easily in hot ethyl alcohol and when recrystallized are pure white in color. After filtering, they are dried at 50° C. and have a melting point of 106° C. The yield is about 58 percent.

Next, pure 2,5,2'5'-tetrachloro-biphenyl is reacted in solution with acetyl chloride in the presence of aluminum chloride. Referring again to the accompanying diagram it is seen that this forms 2,5,2'5'-tetrachloro-4,4'-diacetyl-biphenyl. The following is a more detailed example of the preparation.

Example 2

15 parts by weight of 2,5,2'5'-tetrachloro-biphenyl are dissolved in ten times as much carbon disulfide. To this are first added 80 parts of aluminum chloride and then about 40 parts of acetyl chloride with stirring. This evolves hydrogen chloride. The composition is then refluxed at 56° C. for 6 hours. At the end of this time, the reaction products are poured over ice and hydrochloric acid and allowed to stand for several hours until a precipitate forms. This precipitate is filtered, washed, and dried. The precipitate is purified by dissolving in boiling isobutyl alcohol and activated carbon and then filtered. The product is obtained in white crystalline form in a yield of about 78 percent. This white precipitate is 2,5,2'5'-tetrachloro-4,4'-diacetyl-biphenyl and its preparation is not found in the literature.

From the diacetyl compound, longer alkyl chain derivatives can be formed using the well known Grignard reaction. It is also possible to reduce the dialkyl compounds to the corresponding alcohols and react these alcohols with phthalic anhydride to get new resinous products.

The preparation of 2,5,2'5'-tetrachloro-4,4'-diacetyl-biphenyl from 2,5,2'5'-tetrachloro-biphenyl could not have been predicted from similar reactions carried out with dichloro benzene since the attempt to treat the latter compound in the same manner gives no observed reaction.

From the 2,5,2'5'-tetrachloro-4,4'-diacetyl-biphenyl there can be formed a secondary alcohol which is also unreported in the literature. The above named compound is reduced with aluminum isopropoxide which process results in forming the corresponding secondary alcohol, 2,5,2'5'-tetrachloro-4,4'-di-($\beta$-hydroxyethyl) - biphenyl. A more detailed example of the preparation is found below.

Example 3

57 parts by weight of 4,4'-tetrachloro-4,4'-diacetyl-biphenyl are added to 80 parts of a concentrated solution of aluminum isopropoxide and 100 parts of isopropyl alcohol and the mixture is heated on a glycerine bath at 90–100° C. Separation from the acetone which forms in this reaction may be effected by fractionating for about 7 hours. The remaining mixture is then transferred to another container and stirred with concentrated sodium hydroxide for 30 hours while heating at 90° C. The sodium hydroxide treated mixture is allowed to cool. The bulk of the 2,5,2'5' - tetrachloro - 4,4' - di-($\beta$-hydroxyethyl) - biphenyl crystallizes out in crude form. An additional yield of 2,5,2'5'-tetrachloro-4,4-di-($\beta$-hydroxyethyl)-biphenyl can be obtained by filtering the liquid from the crude 2,5,2'5'-tetrachloro-4,4' - di - ($\beta$ - hydroxyethyl)-biphenyl, separating the isopropyl layer of the filtrate, and evaporating said layer to dryness. The secondary alcohol is obtained by redissolving and recrystallizing. The product, which is 2,5,2'5'-tetrachloro-4,4'-di-(β-hydroxyethyl)-biphenyl has a melting point of 252° C. and the yield is about 62 percent.

Another new compound, 2,5,2'5'-tetrachloro-4,4'-divinyl-biphenyl was next prepared from the 2,5,2'5' - tetrachloro - 4,4' - di-(β-hydroxyethyl)-biphenyl. The latter compound was found to lose two molecules of water when heated in the presence of activated alumina.

*Example 4*

A silica glass tube may serve as the reaction chamber for preparing 2,5,2'5'-tetrachloro-4,4'-divinyl-biphenyl.. In this tube is placed a combustion boat charged with 1 part by weight of 2,5,2'5'-tetrachloro-4,4'-di-(β-hydroxyethyl)-biphenyl to 0.1 part hydroquinone which latter substance is used as a polymerization inhibitor. The tube also contains a layer of 2 parts of activated alumina which serves as the dehydrating agent. The tube is strongly heated to 600–800° C. and the dehydration reaction occurs in the vapor phase. Immediatly adjacent the reaction zone the vapor is rapidly chilled with cold water which causes the divinyl compound to condense and cool below a temperature favoring polymerization.

*Example 5*

The reaction is carried out as above but the pressure in the reaction tube is reduced to 5–10 mm. of mercury and the air is replaced by nitrogen or some other inert gas. A slow stream of the gas is used to sweep the vapors from the reaction zone to the cooling zone.

The 2,5,2'5'-tetrachloro-4,4'-divinyl-biphenyl formed in this process has a particularly valuable use in the prepartion of copolymers with long chain hydrocarbon resins of the kind typified by polystyrene. Copolymerization may also be carried out with other vinyl type resins.

Although hydroquinone is a preferred polymerization inhibitor, others may be used including benzoquinone, cresol, and pyrogallol. It is also possible to obtain results using no inhibitor but in that case the yield is not as satisfactory.

Dehydrating agents other than activated alumina may also be used. Some examples of these are anhydrous zinc chloride, anhydrous potassium hydroxide, thorium oxide, and tungsten oxide.

The dehydration reaction may be carried out in air either at atmospheric pressure or under reduced pressure. In general a high vacuum distillation produces better yields. Also favorable to high yields is the use of an inert atmosphere such as nitrogen, argon, or helium which may be present either at atmospheric pressure or reduced to a pressure of about 10 mm. of mercury.

I claim as my invention:
1. The method of preparing 2,5,2'5'-tetrahalogeno-4,4'-divinyl-biphenyl comprising reacting 2,5,2'5'-tetrahalogeno-biphenyl with acetyl chloride in the presence of aluminum chloride to form 2,5,2'5'-tetrahalogeno-4,4'-diacetyl-biphenyl, reacting said 2,5,2'5'-tetrahalogeno-4,4'-diacetyl-biphenyl with aluminum isopropoxide to form 2,5,2'5'-tetrahalogeno-4,4'-di - (β-hydroxyethyl)-biphenyl, and reacting said 2,5,2'5'-tetrahalogeno-4,4'-di-(β-hydroxyethyl)-biphenyl in the presence of a dehydrating agent to form 2,5,2'5'-tetrahalogeno-4,4'-divinyl-biphenyl.

2. The method of claim 1 in which the final dehydration reaction is carried out under reduced pressure.

3. The method of claim 1 in which the final dehydration reaction is carried out under reduced pressure and in an inert atmosphere.

4. The method of claim 1 in which the final dehydration reaction is carried out under reduced pressure and in an atmosphere of nitrogen.

5. The method of claim 1 in which the final dehydration reaction is carried out in the presence of activated alumina.

6. The method of preparing 2,5,2'5'-tetrahalogeno-4,4'-di-(β-hydroxyethyl)-biphenyl comprising reacting 2,5,2'5'-tetrahalogeno-4,4'-diacetyl-biphenyl with aluminum isopropoxide.

7. In a method of preparing 2,5,2'5'-tetrahalogeno-4,4'-divinyl-biphenyl the step which includes dehydrating 2,5,2'5'-tetrahalogeno-4,4'-di-(β-hydroxyethyl)-biphenyl.

8. In a method of preparing 2,5,2'5'-tetrahalogeno-4,4'-divinyl-biphenyl the steps which include strongly heating 2,5,2'5'-tetrahalogeno-4,4'-di-(β-hydroxyethyl)-biphenyl in the presence of a dehydrating agent and immediately chilling the vaporized reaction products to the solid state.

9. The method of claim 8 in which the dehydrating agent is activated alumina.

10. The method of claim 8 in which a polymerization inhibitor is heated with the 2,5,2'5'-tetrahalogeno-4,4'-di-(β-hydroxyethyl)-biphenyl.

11. The method of claim 8 in which hydroquinone is heated with 2,5,2'5'-tetrahalogeno-4,4'-di-(β-hydroxyethyl)-biphenyl.

12. In a method of preparing 2,5,2'5'-tetrahalogeno-4,4'-divinyl-biphenyl the steps which include strongly heating 2,5,2'5'-tetrahalogeno-4,4'-di-(β-hydroxyethyl)-biphenyl in the presence of a dehydrating agent and a polymerization inhibitor, and immediately chilling the vaporized reaction products to the solid state, said dehydrating reaction taking place under reduced pressure.

13. The process of claim 12 in which the dehydrating reaction is carried out in an inert atmosphere.

14. The process of claim 12 in which the dehydrating reaction is carried out in an atmosphere of nitrogen.

15. The compound 2,5,2'5'-tetrahalogeno-4,4'-di-(β-hydroxyethyl)-biphenyl.

16. The compound 2,5,2'5'-tetrahalogeno-4,4'-divinyl-biphenyl.

FRITZ ROSENTHAL.

REFERENCES CITED

The following references are of record in the file of this patent:

UNITED STATES PATENTS

| Number | Name | Date |
| --- | --- | --- |
| 2,033,541 | Ralston et al. | Mar. 10, 1936 |
| 2,390,368 | Hochwalt | Dec. 4, 1945 |
| 2,427,337 | Abbott et al. | Sept. 16, 1947 |

FOREIGN PATENTS

| Number | Country | Date |
| --- | --- | --- |
| 115,688 | Australia | Aug. 6, 1942 |

OTHER REFERENCES

Ulmann, Liebig's Annalen de Chemie, vol. 332, pages 55–56 (1904).

Beilstein, Handbook of Organic Chemistry, vol. 5, 1st. supplement, page 273 (1931).